(12) United States Patent
Yomogida et al.

(10) Patent No.: US 6,637,660 B2
(45) Date of Patent: *Oct. 28, 2003

(54) BAR CODE READER

(75) Inventors: Matsuo Yomogida; Takuya Tanaka, both of Miyagi; Hideaki Matsuda, Natori, all of (JP)

(73) Assignee: Tohoku Ricoh Co., Ltd., Miyagi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 167 days.

(21) Appl. No.: 09/161,440

(22) Filed: Sep. 28, 1998

(65) Prior Publication Data

US 2001/0042787 A1 Nov. 22, 2001

(30) Foreign Application Priority Data

Oct. 16, 1997 (JP) ................................ 9-283945
Jul. 30, 1998 (JP) ............................... 10-215726

(51) Int. Cl.[7] ................................ G06K 7/10
(52) U.S. Cl. ...................... 235/472.01; 235/462.43
(58) Field of Search ................ 235/472.01, 462.43, 235/462.45, 462.49, 472.03

(56) References Cited

U.S. PATENT DOCUMENTS

| | | | | |
|---|---|---|---|---|
| 3,836,225 A | * | 9/1974 | Wilde et al. ............... 385/115 |
| 3,961,198 A | * | 6/1976 | Aungst ....................... 250/566 |
| 4,385,798 A | * | 5/1983 | Yvick ........................... 385/4 |
| 4,516,017 A | * | 5/1985 | Hara et al. ............. 235/472.01 |
| 4,578,571 A | * | 3/1986 | Williams ................. 235/462.5 |
| 4,900,907 A | * | 2/1990 | Matusima et al. ...... 235/472.01 |
| 5,270,525 A | * | 12/1993 | Ukai et al. ............. 235/472.01 |
| 5,288,984 A | * | 2/1994 | Ito et al. ................ 235/472.01 |
| 5,430,285 A | * | 7/1995 | Karpen et al. ......... 235/472.01 |
| 5,449,892 A | * | 9/1995 | Yamada ................. 235/472.01 |
| 5,585,615 A | * | 12/1996 | Iwanami et al. ....... 235/472.03 |
| 5,825,011 A | * | 10/1998 | Suzuki et al. .......... 235/472.01 |
| 5,828,051 A | * | 10/1998 | Goto ..................... 235/472.01 |
| 5,907,148 A | * | 5/1999 | Iwafuchi et al. ....... 235/472.01 |
| 5,912,449 A | * | 6/1999 | Inoue et al. ........... 235/472.01 |
| 6,010,073 A | * | 1/2000 | Bianchi ................. 235/472.01 |
| 6,036,095 A | * | 3/2000 | Seo ........................ 235/472.01 |
| 6,073,852 A | * | 6/2000 | Seo ........................ 235/472.01 |

FOREIGN PATENT DOCUMENTS

| | | | |
|---|---|---|---|
| EP | 0 264 956 | * | 4/1988 |
| EP | 0 627 705 A2 | * | 7/1994 |
| GB | 2257280 | * | 6/1993 |
| JP | 5-108860 | | 4/1993 |
| JP | 06-203196 | * | 7/1994 |

* cited by examiner

Primary Examiner—Karl D. Frech
Assistant Examiner—Diane I. Lee
(74) Attorney, Agent, or Firm—Armstrong, Westerman & Hattori, LLP

(57) ABSTRACT

A bar code reader for reading a bar code by emitting a laser beam from a laser diode toward the bar code and receiving the subsequently reflected light on a photosensor, in which the photosensor is disposed along an irradiating direction of the laser beam emitted from the laser diode, thereby achieving the most effective arrangement of the laser diode and the photosensor occupying less area.

2 Claims, 7 Drawing Sheets

BAR CODE READER

BACKGROUND OF THE INVENTION

1. Field of the Invention

This invention relates to a bar code reader for reading a bar code by means of irradiating a laser beam from a laser diode toward the bar code and receiving the subsequently reflected light on a photosensor.

2. Description of the Related Art

A bar code reader, for reading a bar code from the reflected light of a laser beam irradiated onto the bar code, has an advantage in that a bar code can be read regardless of any distance between the bar code and the bar code reader, and thus it is in widespread use in various fields, such as marketing and sales management, at the present time.

As an example of the above bar code readers using a laser beam, there is Japanese Patent Laid-open No. Hei 5-108860.

This bar code reader is composed of a hand-held bar code scanner 51 held by hand in use as shown in FIG. 9, and a decoder 53 decoding the bar code in accordance with a signal outputted from the bar code scanner 51.

The bar code scanner 51 is, in turn, composed of: a light source 54, such as a light-emitting diode, irradiating a laser beam (light beam) L; a lens 55 focusing the laser beam L emitted from the light source 54; a light scanner 56 for scanning the laser beam L which has passed through the lens 55; and a photosensor 58 for sensing the amount of reflected light which is scanned over the bar code 57 by the light scanner 56.

The decoder 53 decodes numerals, symbols or the like ciphered in the bar code 57 based on the amount of reflected light sensed by the photosensor 58.

One type of bar code reader is designed so that a laser beam or the like irradiated from a light source is directed to the right and left by means of a mirror, attached to a rotating shaft of a motor, to scan the bar code, and a photosensor receives the light reflected from the bar code, and then numerals, symbols or the like ciphered in the bar code are decoded from signals outputted from the photosensor.

Another type of the bar code reader is a manual type designed so that the bar code reader itself is moved along a bar code to thereby scan without the scanning mechanism, and laterally directing a laser beam irradiated from the light source.

As is clear from FIG. 9, however, the aforementioned bar code reader disclosed in Japanese Patent Laid-open No. Hei 5-108860 has a disadvantage in that the width W from the light source 54 to the photosensor 58 is increased as shown in the drawing due to the fact that the light source 54, such as a light-emitting diode, and the photosensor 58 are disposed so that the incident direction of the reflected light incident onto the photosensor 58 forms an approximate right angle or closer angle thereto with respect to the irradiating direction of the light irradiated from the light source 54.

In the bar code reader shown in FIG. 9, although the bar code reader is not moved, the laser beam L emitted from the light source 54 can be scanned over the bar code 57 by displacing the light scanner 56. There is, however, a disadvantage in which, in view of the large variation in optical paths of the laser beam L emitted from the light source 54 and the reflected light reflected from the bar code 57 and incident onto the photosensor 58, a reading end port, formed on the end of the bar code reader which is pointed toward the bar code for scanning, is required to be formed so as not to obstruct the laser beam and the reflected light.

In consequence, the reading end port of the bar code reader is naturally large and the thickness of a portion corresponding of the reading end port cannot be made compact, so that the bar code reader itself increases in size and weight, resulting in inconvenience in a hand-held type bar code reader which an operator holds by hand while in use.

SUMMARY OF THE INVENTION

To resolve the aforementioned disadvantages, it is an object of the present invention to achieve reduction in size in a bar code reader by means of an arrangement of a laser diode, irradiating a laser beam, and a photosensor, receiving a light reflected from a bar code after the laser beam is incident onto the bar code, in a small area.

In order to achieve the above object, in a bar code reader for reading a bar code by means of emitting a laser beam from a laser diode toward the bar code and receiving the subsequently reflected light on a photosensor, the photosensor is disposed along an irradiating direction of the laser beam emitted from the laser diode.

In the above arrangement, the laser diode and the photosensor can be effectively arranged in a smaller area, resulting in a reduction in size of the bar code reader.

In the above bar code reader, preferably, the laser diode and the photosensor are housed in a case, and a scanning mirror for reflecting the laser beam, emitted from the laser diode, directly or through the medium of a mirror to redirect an optical path of the laser beam; and a mirror-setting angle changing means for changing the angle of setting of the scanning mirror, are provided in the front end portion of the case in the irradiating direction of the laser beam.

In the above arrangement, although the bar code reader is not moved, the laser beam emitted from the laser diode can scan over the bar code by means of the scanning mirror displaced by the mirror-setting angle changing means.

In addition, although the laser beam is scanned in a predetermined scanning width by the displacement of the scanning mirror, since the scanning mirror and the mirror-setting angle changing means are provided in the front end portion of the case in the irradiating direction of the laser beam, the scanned laser beam passes through the front end portion of the case at a close proximity to the scanning mirror.

Consequently, even when a reading end port of the front end portion of the case comprises a smaller opening, the laser beam never hits the case, so that the size of the bar code reader can be reduced.

Moreover, the bar code reader is structured to include a case shaped to have a bent front end portion, in which the laser diode and the photosensor are housed in the inside of a portion between the bent portion and the tail portion of the case, and the scanning mirror for reflecting the laser beam, emitted from the laser diode, to redirect an optical path of the laser beam; the mirror-setting angle changing means for changing the angle of setting of the scanning mirror; and a reflected-light path changing member for reflecting the reflected light, reflected from the bar code after being reflected toward the bar code by the scanning mirror, toward the photosensor, are provided in the bent portion of the case.

According to the above arrangement, even if the bar code is located on the other side of a small hole such as a venting hole, by inserting the bent portion of the case into the hole, the laser beam emitted from the laser diode can hit the bar code at an approximate right angle, whereby the bar code is read with high accuracy.

Even when the bar code is adhered onto a surface of a box or the like facing a wall, insofar as there is a space between the wall and the surface on which the bar code is adhered, which allows the bent portion of the case to be inserted therein, the bar code can be effortlessly read by inserting the bent portion of the case into the space.

Preferably, the mirror-setting angle changing means comprises a piezoelectric element. As a result, the mirror-setting angle changing means is not a hindrance due to its smaller size and the bar code reader has a simple structure due to the fact that the mirror-setting angle changing means is easily installed and located.

The above and other objects, features and advantages of the present invention will be apparent from the following detailed description which is to be read in conjunction with the accompanying drawings.

DETAILED DESCRIPTION OF THE PREFERRED EMBODIMENT(S)

Preferred embodiments according to the present invention will be described below with reference to the accompanying drawings.

Figure 1:
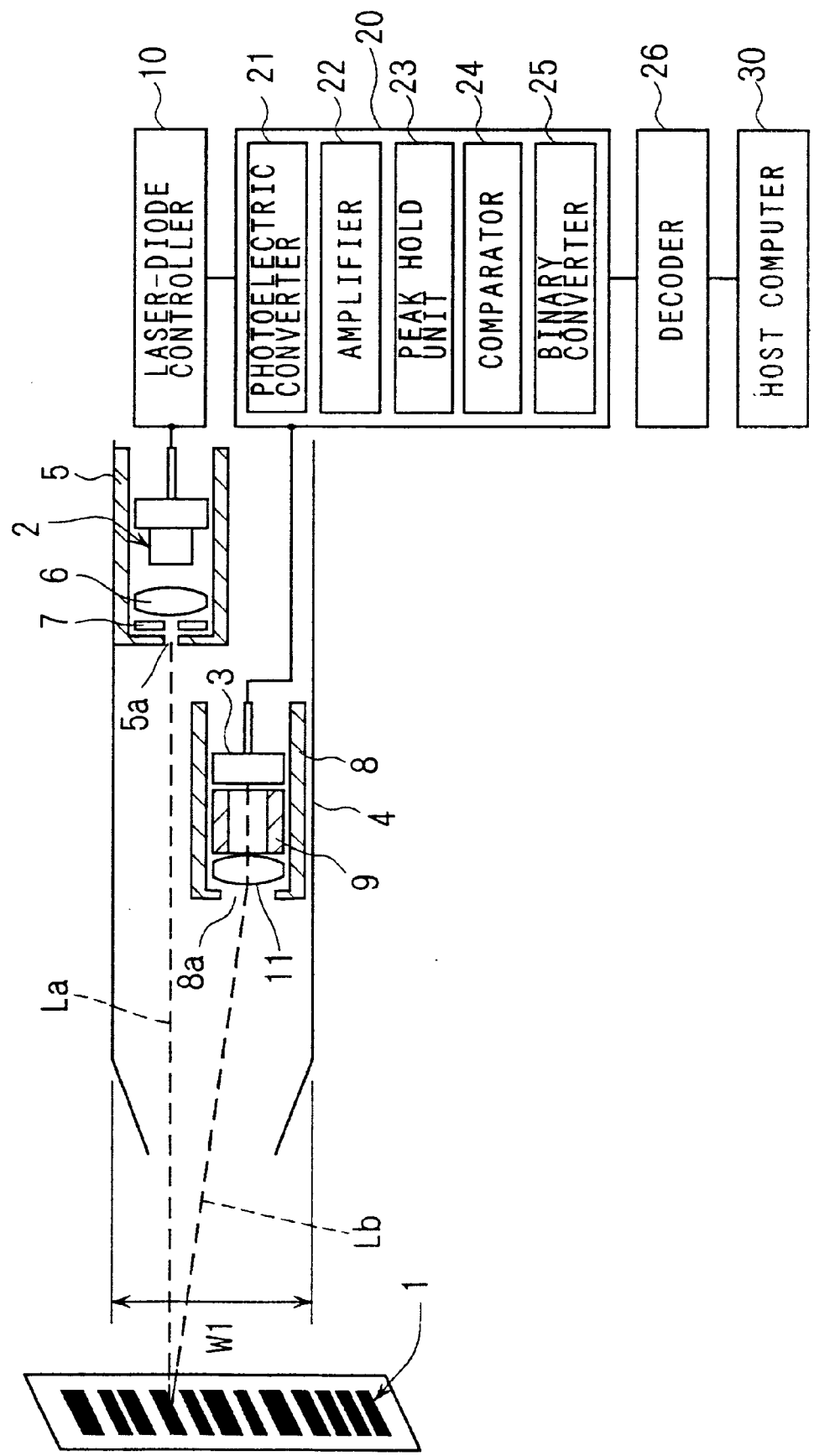
FIG. 1 is a block diagram showing a first embodiment of a bar code reader according to the present invention along with a bar code.

First Embodiment: FIG. 1

FIG. 1 is a block diagram showing a first embodiment of a bar code reader according to the present invention along with a bar code, which shows an example of the bar code reader applied to a pentype bar code reader.

The pentype bar code reader reads a bar code 1 by being manually moved along and on the bar code 1, and a laser beam La is emitted from a laser diode 2 to the bar code 1 and the subsequently reflected light Lb is received on a photosensor 3 such as a phototransistor, whereby the bar code 1 is read.

The laser diode 2 and the photosensor 3 are both disposed in a case 4, in which the photosensor 3 is positioned along the irradiating direction of the laser beam La emitted from the laser diode 2 as shown in the drawing.

The laser diode 2 is housed in a laser-diode fixing member 5 which is immovably placed in the tail portion (the right side in FIG. 1) of the case 4, and in which a collimator lens 6 is positioned in front of the laser diode 2 and a lens stop 7 is positioned in front of the collimator lens 6.

An aperture 5a is formed on the front face of the laser-diode fixing member 5. The laser beam La emitted from the laser diode 2 through the medium of the collimator lens 6 and the lens stop 7 is irradiated through the aperture 5a to the outside of the case 4.

A laser-diode controller 10 controls the emission and stopping of the laser beam La in the laser diode 2.

The photosensor 3 is housed in a photosensor fixing member 8 which is immovably placed slightly forward of and parallel to the laser-diode fixing member 5. In the photosensor fixing member 8, a spacer 9 is positioned in front of the photosensor 3 and a lens 11 is positioned in front of the spacer 9.

An opening 8a is formed in the front face of the photosensor fixing member 8 so that the reflected light Lb, reflected from the bar code 1 after being irradiated from the laser diode 2 to the bar code 1, is received into the photosensor fixing member 8 through the opening 8a.

The photosensor 3 is connected to a digitizing processor 20 which is composed of a photoelectric converter 21, an amplifier 22, a peak hold unit 23, a comparator 24, and a binary converter 25. The digitizing processor 20 digitizes an electric signal outputted from the photosensor 3 in response to the intensity of the reflected light Lb which is reflected from the bar code 1 and received by the photosensor 3.

The digitized signal in the digitizing processor 20 is outputted to a decoder 26 connected to the digitizing processor 20, and analyzed therein in order to be converted into information corresponding to numerals or symbols in on the printed bar code 1. The analyzed information is then sent to a host computer 30 connected to the bar code reader.

When using the bar code reader, upon pushing an operating button (not shown), the laser diode controller 10 operates the laser diode 2, whereby the laser beam La is emitted from the laser diode 2.

Therefore, when the front end (the left side in FIG. 1) of the bar code reader is pointed toward the bar code 1 so that the laser beam La can hit the bar code 1, and the bar code reader is moved along the bar code 1 by hand to scan it, the reflected light Lb reflected from the bar code 1 is received through the lens 11 and the spacer 9 into the photosensor 3.

After that, an electric signal outputted from the photosensor 3 in response to the reflected light Lb is converted into voltage in the photoelectric converter 21 of the digitizing processor 20, and amplified in the amplifier 22. Successively, in the peak hold unit 23, the scanned information is determined as differences, and the comparator 24 compares the values of the differences determined above, and the binary converter 25 digitizes the compared result.

The digitized signal is analyzed in the decoder 26, and then the analyzed information is sent to the host computer 30.

As is clear from FIG. 1, in this bar code reader, the photosensor 3 is disposed along the irradiating direction (optical path) of the laser beam La emitted by the laser diode 2. As a result, the optical path of the laser beam La from where the laser diode 2 emits the laser beam La to where the laser beam La hits the bar code 1, and the optical path of the reflected light Lb from the point of reflection on the bar code 1 to the point of reception on the photosensor 3 are accommodated in the minimum range, so that the width W1 of the case 4 is decreased, resulting in a reduction in the size of the bar code reader.

Figure 2:
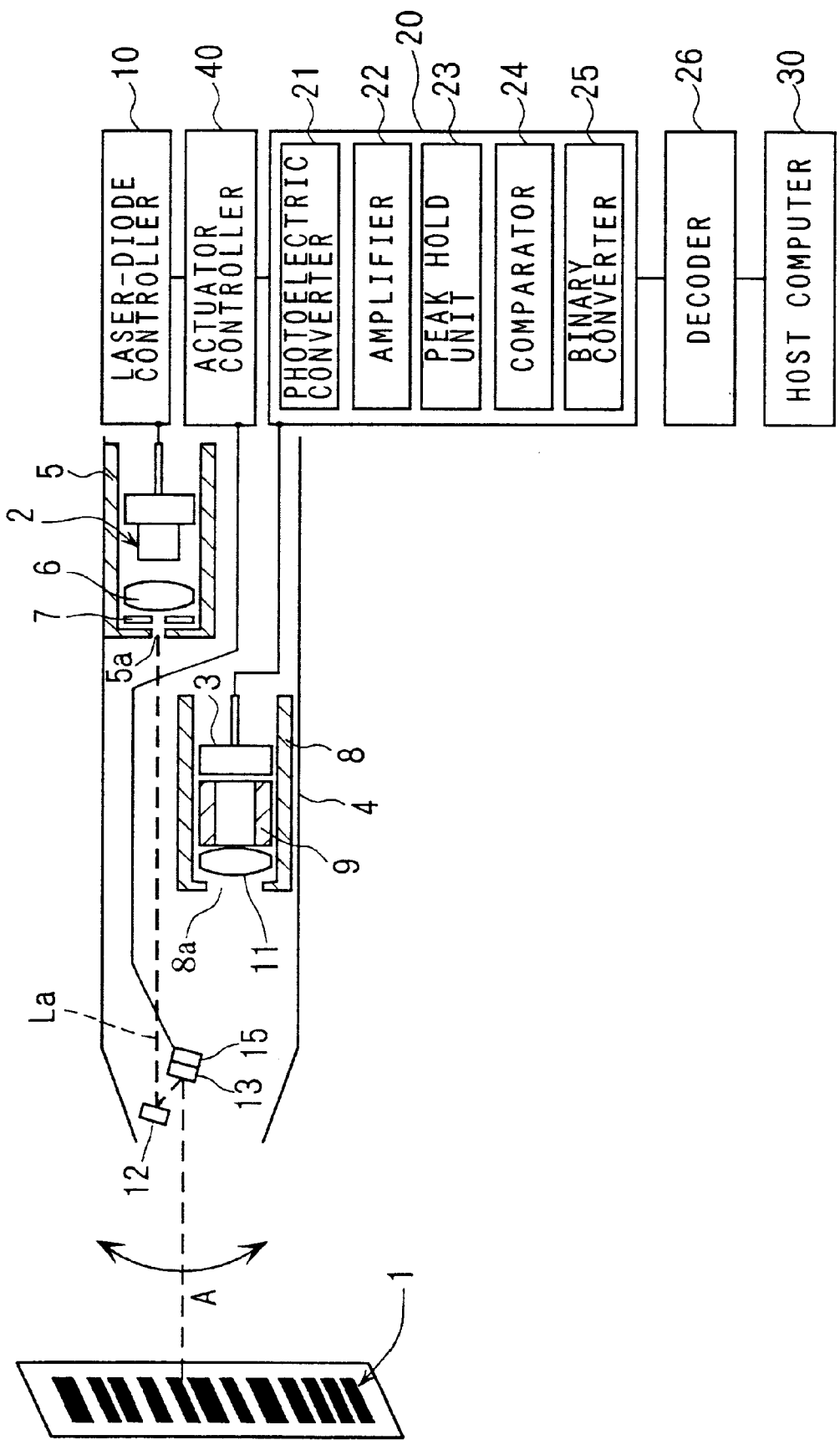
FIG. 2 is a block diagram showing a second embodiment of the bar code reader according to the present invention along with the bar code.
Figure 3:
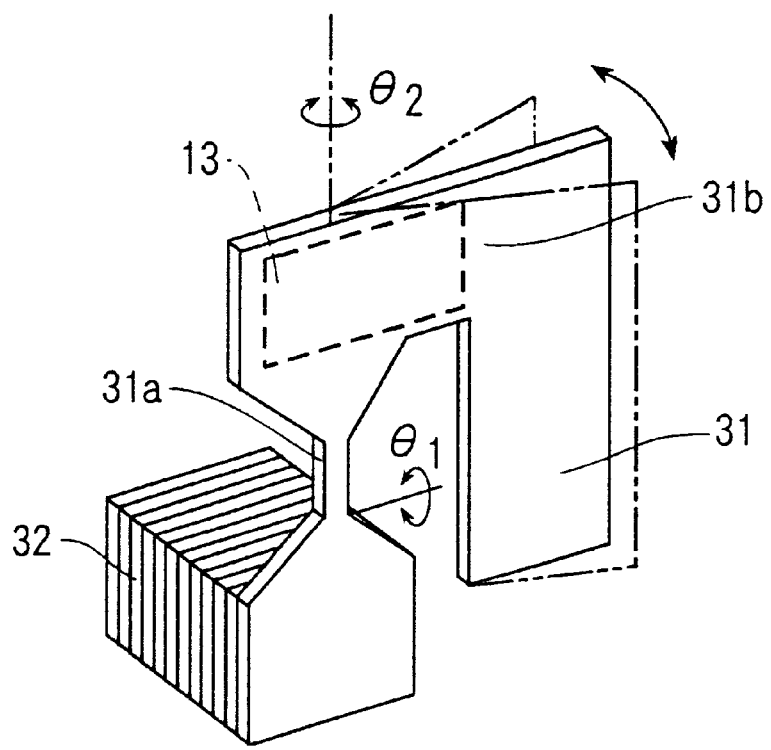
FIG. 3 is a perspective view showing an example of a piezoelectric actuator driving a scanning mirror provided in the bar code reader in FIG. 2.

Second Embodiment: FIG. 2 and FIG. 3

FIG. 2 is a block diagram showing a second embodiment of a bar code reader according to the present invention along with a bar code, which shows an example of the bar code reader applied to a code reader having a laser-beam scanning mechanism.

In FIG. 2, the same reference numerals and symbols are used for parts corresponding to those of FIG. 1.

The bar code reader is designed so that the laser beam La emitted from the laser diode 2 can be scanned on the bar code 1 without moving the bar code reader along the bar code 1 by hand.

More specifically, in the above bar code reader, a stationary optical-path changing mirror 12 as well as the laser diode 2 and the photosensor 3 are housed in the case 4, and additionally, a scanning mirror 13 is provided therein in order to reflect and direct the laser beam La, which has been emitted from the laser diode 2 and redirected on its optical path by the optical-path changing mirror 12, toward the bar code 1 to scan in the direction of arrow A.

In the front end portion (the left side in FIG. 2) of the case 4 in the irradiating direction of the laser beam, the bar code reader has a piezoelectric actuator 15 functioning as a mirror-setting angle changing means for changing a setting angle (an angle in the direction of arrow A) of the scanning mirror 13.

The piezoelectric actuator 15 has, for example, a shape as shown in FIG. 3, and is composed of an oscillating plate 31 and an actuator unit 32 for oscillating the oscillating plate 31.

In the oscillating plate 31, a spring portion 31a having a narrower width is formed. By the spring portion 31a, a mirror fixing portion 31b fixing the scanning mirror 13 can be displaced in two directions, shown in FIG. 3, along a bending direction $\theta_1$ and a torsion direction $\theta_2$.

The actuator unit 32 consists of a laminated piezoelectric element, in which plural laminated piezoelectric elements are oscillated in resonant frequencies responsive to the displacements in the above-mentioned two directions, whereby the mirror fixing portion 31b is displaced in the two directions along the bending direction $\theta_1$ and the torsional direction $\theta_2$.

Therefore, when the mirror fixing portion 31b is displaced by the actuator unit 32 so that the laser beam La is directed in the direction of arrow A in FIG. 2, the scanning mirror 13 fixed to the mirror fixing portion 31b is displaced together with the mirror fixing portion 31b.

For this reason, the optical path of the laser beam La, traveling toward the bar code 1 through the agency of the scanning mirror 13 after being emitted from the laser diode 2 and then redirected on its optical path by the optical-path changing mirror 12, can be directed in the direction of arrow A.

The redirection of the optical path of the laser beam La, caused by changing angles of the scanning mirror 13, is carried out by a manner in which the actuator controller 40 drives the piezoelectric actuator 15 until the scanning mirror 13 attains a setting angle.

In the bar code reader in which the laser beam La emitted from the laser diode 2 can be scanned over the bar code 1 by changing the setting angles of the scanning mirror 13 although the bar code reader is not moved along the bar code 1 by hand as described hereinbefore, the reading end port opened in the front end portion of the case 4 must be opened larger depending on the arranged position of the scanning mirror 13.

Figure 4:
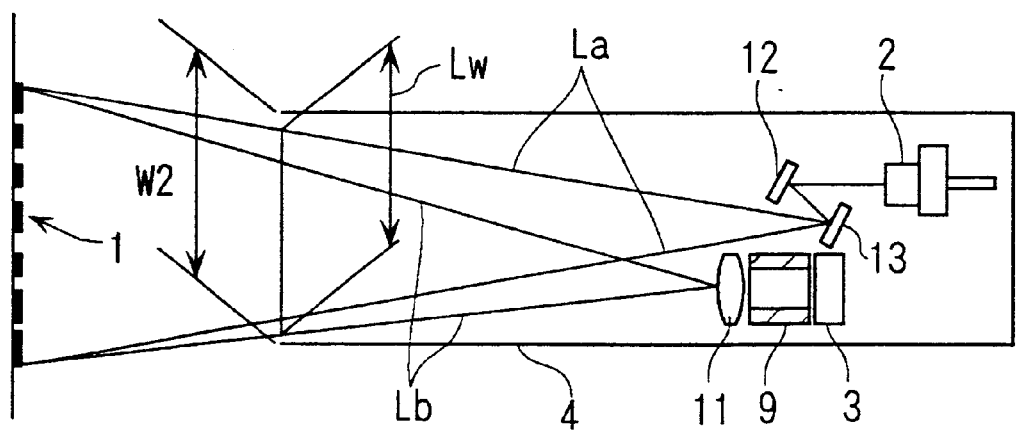
FIG. 4 is an explanatory view for showing a state in which a reading end port of a case is increased in size when the scanning mirror of FIG. 3 is disposed in the tail portion of the case.

More specifically, as shown in FIG. 4, where the scanning mirror 13 is placed on the tail end portion (the right side in the drawing) of the case 4 so as not to obstruct the optical path, a range Lw between the transiting paths of the laser beam La, emitted from the laser diode 2, and the reflected light Lb, received by the photosensor 3 after being reflected from the bar code 1, increases.

For this reason, the width W2 of the reading end port formed in the front end of the bar code reader needs to be enlarged in size so that the laser beam La and the reflected light Lb do not obstructed. Thus, it is difficult to achieve reduction in size of the bar code reader.

In the bar code reader according to the present embodiment, however, as explained in FIG. 2, the laser diode 2, the photosensor 3, the stationary optical-path changing mirror 12, the scanning mirror 13 and the piezoelectric actuator 15 are all housed in the front end portion (the left side in FIG. 2) of the case 4 in the irradiating direction of the laser beam, thereby achieving reduction in size of the bar code reader.

Figure 5:
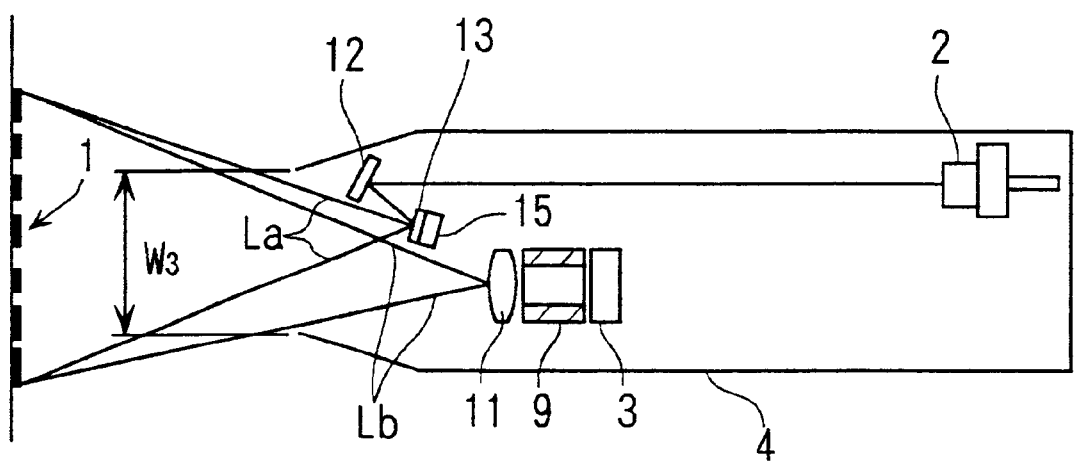
FIG. 5 is an explanatory view for showing a state of the achievement of the smaller width of the reading end port of the case when the scanning mirror of FIG. 3 is disposed in the front portion of the case.

That is to say, as shown in FIG. 5, even when the laser beam La is scanned within the range of a predetermined scanning width by the scanning mirror 13, the traveling laser beam La can pass through the front end portion of the case 4 at a close proximity to the scanning mirror 13.

In consequence, although the width W3 of the reading end port formed in the front end of the case 4 is formed to be narrower as shown in the drawing, the laser beam La and the reflected light Lb are not obstructed by the case 4, so that the bar code reader as well as the reading end port can be reduced in size.

As described hereinbefore, the piezoelectric actuator 15 for displacing the scanning mirror 13 is provided in the front end portion of the case 4, but since the piezoelectric actuator 15 has, as explained in FIG. 3, a simple formation composed of the oscillating plate 31 and the actuator unit 32 and has a smaller size, it never obstructs the laser beam La emitted from the laser diode 2 and the reflected light Lb received in the photosensor 3 after being reflected from the bar code 1.

Figure 6:
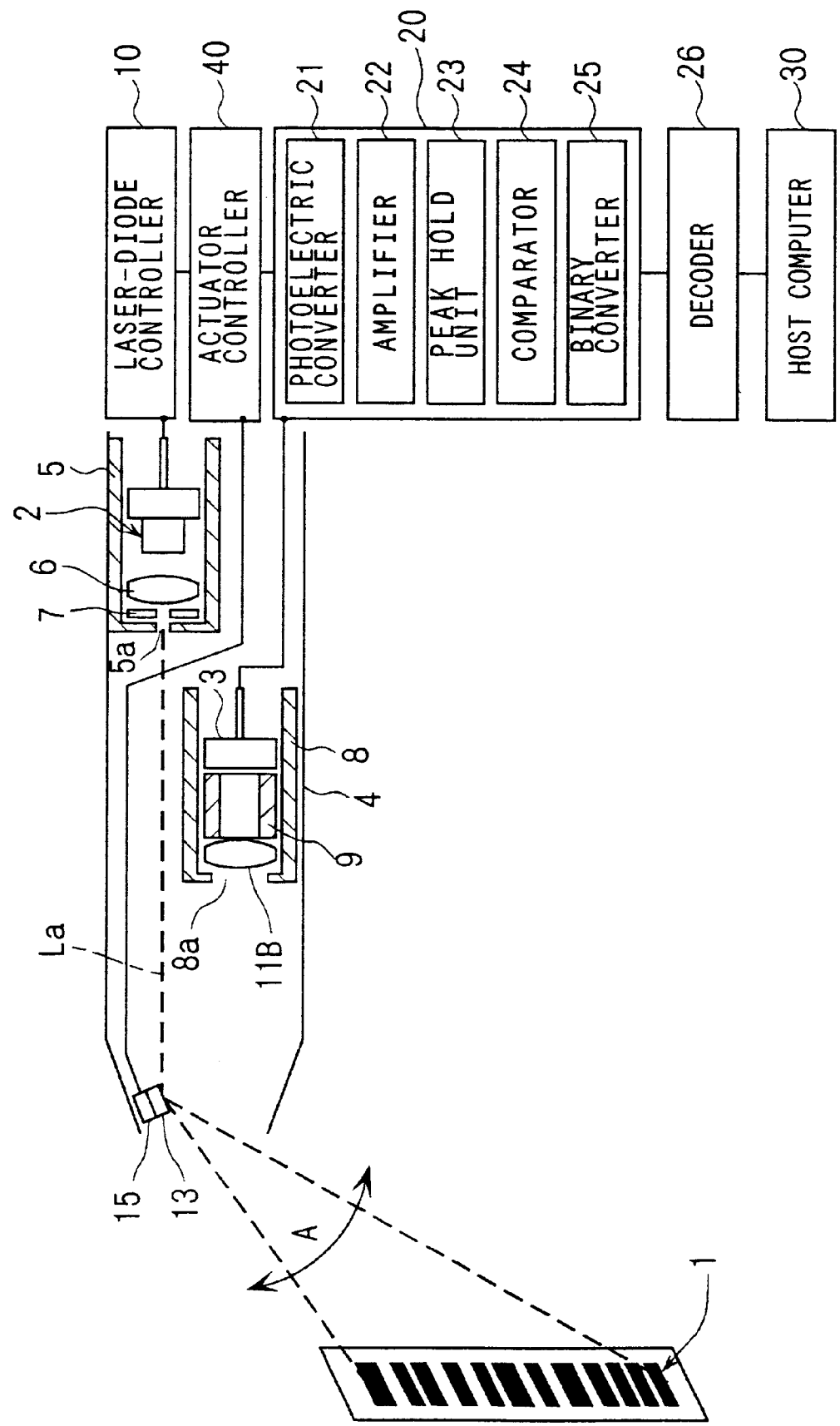
FIG. 6 is a block diagram showing a third embodiment of a bar code reader according to the present invention along with a bar code.

Third embodiment: FIG. 6

FIG. 6 is a block diagram showing a third embodiment of a bar code reader according to the present invention along with a bar code, which shows an example of a bar code reader structured so that a laser beam emitted from a laser diode is directly reflected by a scanning mirror, not using a stationary mirror, so as to be redirected on its optical path.

Incidentally, in FIG. 6, the same reference numerals and symbols are used for parts corresponding to those of FIG. 2.

One different feature of this bar code reader from that of the second embodiment shown in FIG. 2 is that the laser beam La emitted from the laser diode 2 is directly reflected by the scanning mirror 13 without the stationary mirror so as to be redirected on its optical path, and the optical path of the laser beam La is redirected in the direction of arrow A by oscillating the scanning mirror 13.

Similar to the bar code reader described in FIG. 2, this bar code reader is structured so that the laser diode 2, the photosensor 3, the piezoelectric actuator 15 and so on are also housed in the case 4.

Since the scanning mirror 13 is placed in the front end portion (the left side in FIG. 6) of the case 4 in the irradiating direction of the laser beam, even when the laser beam La is directed in a predetermined scanning width in the direction of arrow A by the scanning mirror 13, the traveling laser beam La can pass through the front end portion of the case 4 at a close proximity to the scanning mirror 13.

In consequence, although the reading end port of the case 4, being the left side in FIG. 6, is formed to be narrower as shown in the drawing, the laser beam La is not obstructed by the case 4, resulting in a reduction in size of the bar code reader.

Note that, in the above bar code reader, a lens 11B comparable to the lens 11 of the bar code reader explained in FIG. 2 is used, but the usage of the lens 11B slightly differs from the lens 11 in FIG. 2.

More specifically, the lens 11B of this bar code reader is not designed to focus on a point with high precision, but is designed so that the photosensor 3 can undiscriminatingly receive the reflected light corresponding to white and black of the entire bar code to be read.

Therefore, in the bar code reader, the intensity of monochrome, corresponding to the reflected light which is the laser beam La reflected from the bar code 1 after being emitted from the laser diode 2 and then scanned in the direction of arrow A in accordance with the length of the bar code 1, results in the differences in the photo-current of the photosensor 3.

The electric signal outputted from the photosensor 3 is converted to voltage by the photoelectric converter 21. The voltage is amplified by the amplifier 22, and a peak value of the voltage is held in the peak hold unit 23.

After the comparator 24 compares the peak value with a voltage amplified in the amplifier 22, the electric signal is digitized in the binary converter 25.

The decoder 26 analyses the digitized signal for converting it into information corresponding to numerals and symbols enclosed in the bar code 1. The data according to the intensity of monochrome on the bar code 1 is then sent to the host computer 30 connected to the bar code reader.

Figure 7:
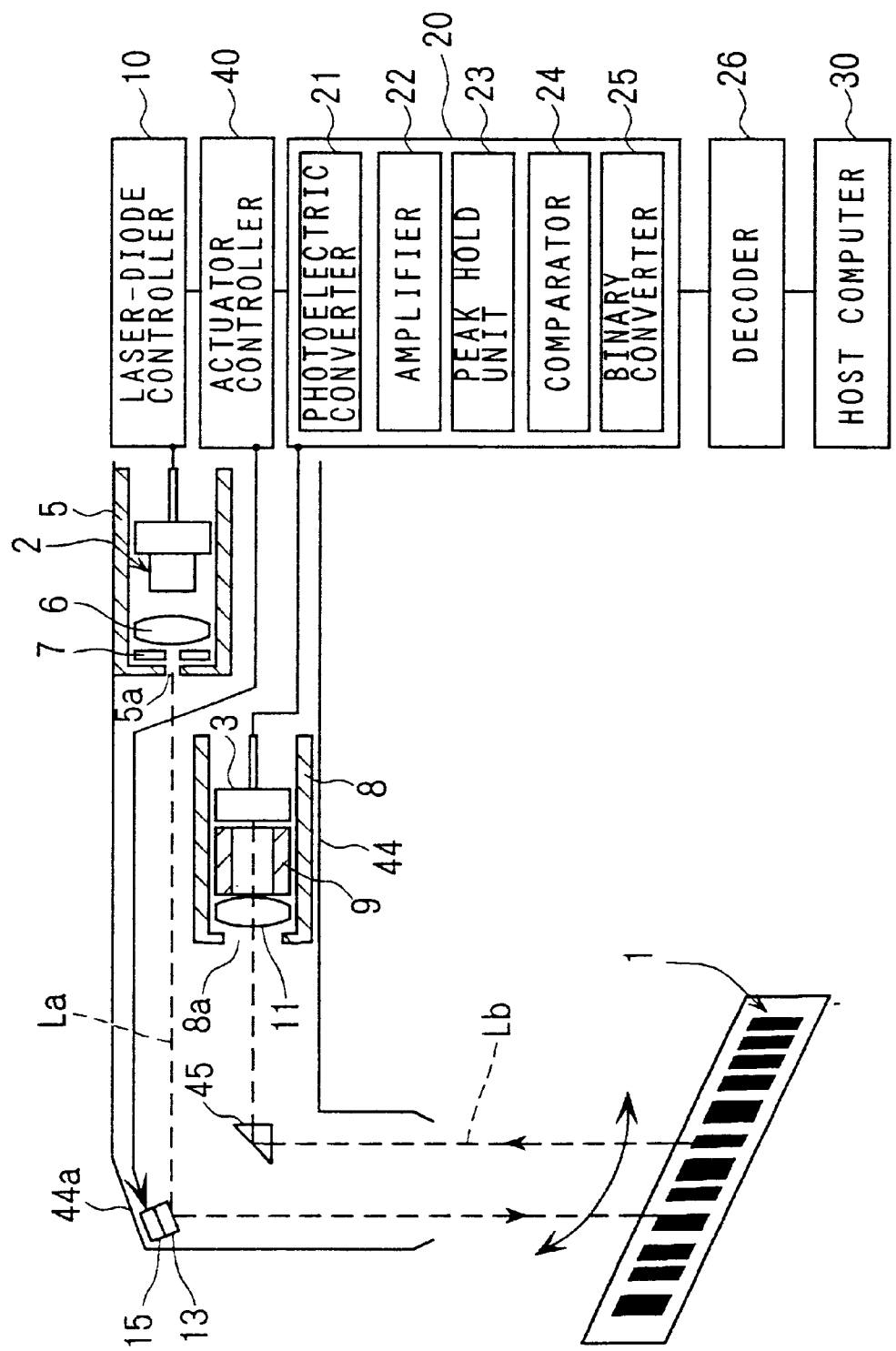
FIG. 7 is a block diagram showing a fourth embodiment of a bar code reader according to the present invention along with a bar code.

Fourth embodiment: in FIG. 7

FIG. 7 is a block diagram showing a fourth embodiment of a bar code reader according to the present invention along with a bar code, in which the same reference numerals and symbols are used for parts corresponding to these of FIG. 2.

This bar code reader is provided with a case 44 shaped to have the front end portion (the left side in FIG. 7) bent at an approximate right angle as shown in the drawing. The laser diode 2 and the photosensor 3 are housed in a portion between a bent portion 44a and the tail end (the right side in FIG. 7) of the case 44.

Inside the bent portion 44a of the case 44, the scanning mirror 13 for reflecting the laser beam La, emitted from laser diode 2 so as to alter the optical path of the laser beam La, and the piezoelectric actuator 15, functioning as the mirror-setting angle changing means for changing the setting angle of the scanning mirror 13, are provided.

Moreover, in the bent portion 44a, a prism 45 as a reflected light path changing member for reflecting the reflected light Lb, reflected from the bar code 1 after being reflected toward the bar code 1 by the scanning mirror 13, toward the photosensor 3, is provided.

The prism 45 is a right-triangle reflective prism having the two faces with a right angle therebetween and that are finished with an anti-reflection coating (AR coating). In addition, the hypotenuse face is provided with a reflection coating (RC) in order to obtain a high rate of reflected light, even in the event of an non-perpendicular incident light.

Note that the bending angle of the bent portion 44a of the case 44 is not limited to an approximate right angle as described hereinbefore, and can be appropriately changed in accordance with conditions for setting an optimum optical system, such as adjusting for the reflected-light path changing member or the scanning mirror housed in the case 44, or for circumstances of the object to be scanned.

Figure 8:
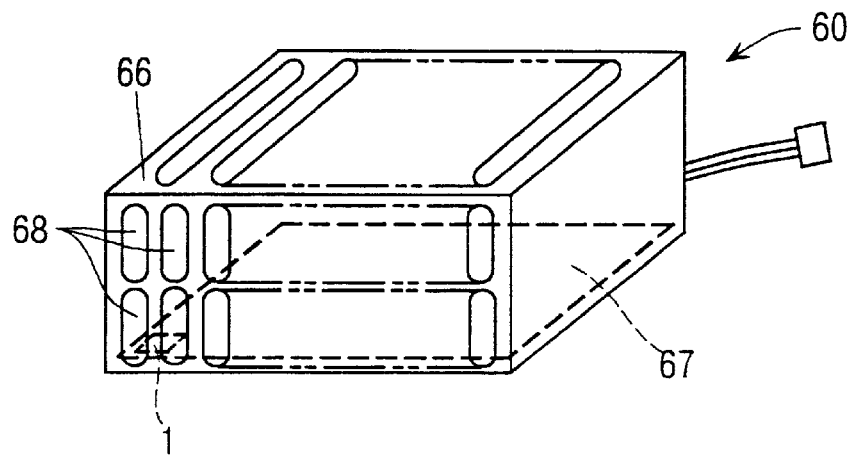
FIG. 8 is a perspective view showing an example of power supplies in which a basic board is secured in a metallic cover having a plurality of elliptical venting holes.
Figure 9:
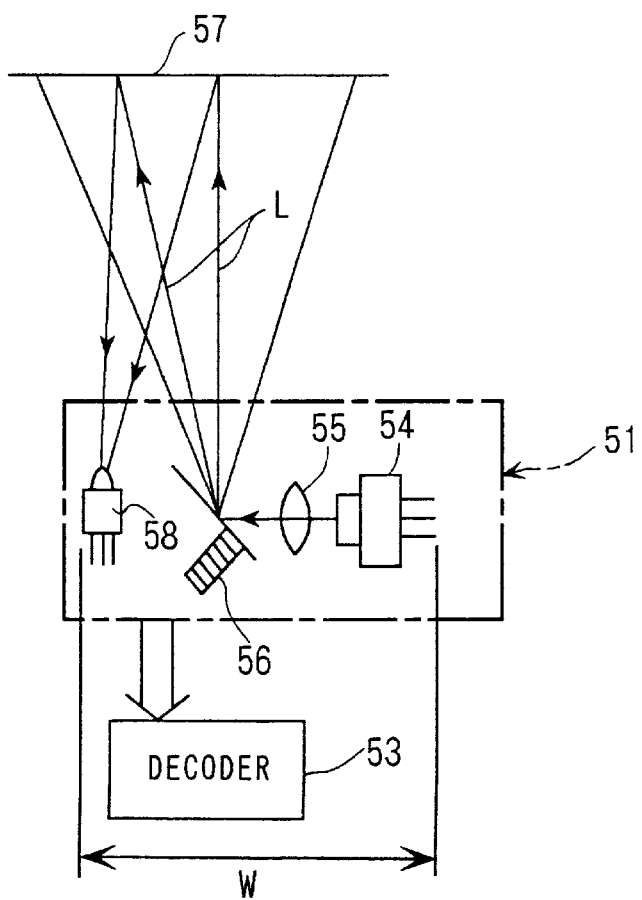
FIG. 9 is a general block diagram showing an example of conventional handheld type bar code readers.

Now, as shown in FIG. 8, in a power supply 60 in which a base board 67 is secured on the bottom portion inside a metallic cover 66 having a plurality of elliptical venting holes 68, when the bar code 1 attached to the base board 67 is read with the bar code reader, conventionally, the metallic cover 66 has to be removed and then the bar code 1 can be read.

Even if the front end portion of the bar code reader, from which the laser beam is irradiated, is inserted into the venting hole 68 of the metallic cover 66 to access and read the bar code 1, the laser beam radiates diagonally from the bar code reader onto the bar code 1, naturally resulting in a high percentage of reading error.

Even in this case, however, provided that the bar code reader explained in FIG. 7 is used, the front end portion of the bar code reader can be smoothly inserted into the venting hole 68 due to the smaller reading end port formed in the front end of the case 44. Additionally, since the front end portion of the case 44 is bent at an approximately right angle as described hereinbefore, the front end portion can be positioned approximately perpendicular to the bar code 1, whereby the laser beam La emitted from the bar code reader can hit the bar code 1 at an approximately right angle. As a result, the bar code 1 is read with high accuracy and the metallic cover 66 need not be removed.

As described thus far, provided that this bar code reader is used, the information on the bar code 1 attached to the base board 67 inside the metallic cover 66 can be easily read without removing the metallic cover 66 during the maintenance of the power supply 60 or the like.

Next, examples of effective use of the bar code reader according to the present invention will be now explained.

For example, a bar code label is often adhered for stock control on the surface of a cardboard box stocked in a warehouse. In this case, for effective reading of the information on the bar code, the cardboard box should be placed so that the surface of the cardboard box on which the bar code label is adhered does not face a wall of the warehouse.

However, in the use of the bar code reader shown in FIG. 7, the front end portion of the case 44 is bent at an approximately right angle, so that if there is a limited space between the wall and the cardboard box which allows the front end portion of the case 44 to be inserted therein, the bent front end portion of the bar code reader can be inserted into the space, thereby reading the bar code. Therefore, the surface with the bar code can face the wall when the cardboard box is stored in the warehouse.

As described above, since the bar code reader shown in FIG. 7 is designed so that the front end portion of the case 44 is bent at an approximately right angle, even when the cardboard box is placed so that its surface with the bar code label faces the wall, the cardboard box does not need to be turned to display the bar code on the surface of the cardboard box insofar as there is the small space between the wall and the cardboard box, resulting in easy reading of the bar code.

In another example, a bar code label adhered to an electric appliance or the like in an office or the like is not adhered on the front face of the electric appliance and is often adhered on a side face or the rear face thereof for aesthetic reasons.

Usually, the face with the bar code label adhered thereon is oriented to a wall of the room. When a service engineer or the like wants to read with the bar code reader the bar code label adhered to the electric appliance or the like in the above manner, the electric appliance or the like must be moved to make a certain space between the wall and the electric appliance, resulting in inconvenient work.

When the bar code reader explained in FIG. 7 is used, however, by only leaving a small space between the wall and the surface of the electric appliance with the bar code label which allows the front end portion of the case 44 to be inserted therein, the bar code can be effortlessly read by inserting the bent front end portion of the bar code reader into the small space.

It should be mentioned that in the bar code reader shown in FIG. 7, since the prism 45 is used as the reflected light path changing member, there are the following advantages:

1. the transmittance is extremely high but the decline in the amount of receiving light is smaller than that when using a mirror;
2. mounting on an attaching portion is easy and the prism has the strength to resist deformation caused by external mechanical stress;
3. white light is dispersed according to constituent wavelengths, so that light reaching the photosensor can be selected, therefore there is no influence by other light and only the wavelength of the laser beam can be easily received.

Incidentally, even when a mirror is used as the reflected-light path changing member, the bar code reader shown in FIG. 7 can be structured.

Effects of the Invention

As described hereinbefore, according to a bar code reader of the present invention, since a photosensor is placed along an irradiating direction of a laser beam emitted from a laser diode, the laser diode and the photosensor can be placed in a small area, resulting in a reduction in size of the bar code reader.

When the front end portion of a case is bent and a scanning mirror, a mirror-setting angle changing means and a reflected light path changing member are housed in the bent portion of the case, even if the bar code is on the other side of a small hole, the bar code can be read with high accuracy by inserting the bent portion of the case into the hole.

In addition, although the bar code attached on a surface of a box or the like faces a wall to leave a small space between the wall and the surface the bar code is easily read by inserting the bent portion of the case into the small space.

What is claimed is:

1. A bar code reader for reading a bar code by means of emitting a laser beam from a laser diode toward the bar code and receiving a subsequently reflected light on a photosensor, wherein the photosensor is disposed along an initial irradiating direction of the laser beam emitted from the laser diode, and said photosensor receives said reflected light along said initial irradiating direction;

wherein a case shaped to have a front end portion thereof bent into an approximate right angle is provided so that the laser diode and the photosensor are housed inside of a portion between the bent portion and a tail end portion of the case, the photosensor is placed in front of the laser diode along the initial irradiation direction, and a scanning mirror for reflecting the laser beam, emitted from the laser diode, to redirect an optical path of the laser beam, a mirror-setting angle changing means for changing an angle of setting of the scanning mirror, and a reflected-light path changing member for reflecting the reflected light, reflected from the bar code after being reflected toward the bar code by the scanning mirror, toward the photosensor, are provided in the bent portion of the case.

2. The bar code reader according to claim 1, wherein said mirror-setting angle changing means comprises a piezoelectric element.

* * * * *